United States Patent Office 3,758,443
Patented Sept. 11, 1973

3,758,443
PROCESS FOR THE PRODUCTION OF POLY-
URETHANE ELASTOMERS BASED ON A
PARTICULAR POLYOL POLYCARBONATE
Klaus Konig, Erwin Muller, and Cornelius Muhlhausen, Leverkusen, and Uwe Jens Dobereiner, Opladen, Germany, assignors to Bayer Aktiengesellschaft, Leverkusen, Germany
No Drawing. Continuation of abandoned application Ser. No. 98,928, Dec. 16, 1970. This application Apr. 24, 1972, Ser. No. 247,212
Int. Cl. C08g 22/10, 17/13
U.S. Cl. 260—75 NP         5 Claims

ABSTRACT OF THE DISCLOSURE

A process is provided for the production of polyurethane elastomers by reacting higher molecular weight hydroxy compounds which have a molecular weight of 800 to 2500, diisocyanates and low molecular weight compounds which have a molecular weight of up to 400 and which contain at least two hydrogen atoms reactive with isocyanates, characterized in that the higher molecular weight hydroxy compounds are condensation products of 1,6-hexane diol, adipic acid and diaryl carbonate.

---

This is a continuation of application Ser. No. 98,928, filed Dec. 16, 1970, now abandoned.

The production of polyurethane elastomers from higher molecular weight hydroxy compounds, diisocyanates and chain lengthening agents has been described frequently in the literature. Elastomers which are resistant to hydrolysis can be obtained, for example, as described in German Pat. 1,218,717 if the higher molecular weight hydroxy compound is a polyester of hexane-1,6-diol and adipic acid. A further improvement in hydrolysis resistance can be achieved as described in French Pat. 1,540,-799 by using a hexane-1,6-diol polycarbonate obtained by ester interchange of hexane-1,6-diol, for example, with diphenyl carbonate as the higher molecular weight hydroxy compound.

Both the polyester of hexane-1,6-diol and adipic acid and the hexane-1,6-diol polycarbonate have a waxy consistency and soften only at temperatures above 45° C. The softening point of the higher molecular weight hydroxy compound largely determines the freezing point of the elastomers which are obtained from this compound (the freezing point drops with decreasing softening point and conversely). Hence, elastomers obtained from the higher molecular weight hydroxy compounds of the German and French patents are resistant to hydrolysis but have a freezing temperatures of about —21° C. At lower temperatures, these elastomers lose their elasticity and are converted into a glassy state (glass transition temperature).

Accordingly, elastomers of this type have only a limited applicability at low temperatures. Even when mixtures of the two above described higher molecular weight hydroxy compounds is used the freezing temperature or glass transition temperature of elastomers obtained from them is only insignificantly altered.

It is therefore an object of this invention to provide improved polyurethane elastomers and a process for preparing them which are devoid of the foregoing disadvantages.

Another object of this invention is to provide polyurethane elastomers having improved hydrolysis resistance and a process for preparing them.

Still another object of this invention is to provide improved polyurethane elastomers which have low freezing points, particularly in combination with a high degree of hydrolysis resistance, and a process for preparing them.

A further object of this invention is to provide polyurethane elastomers which are suitable for use even at low temperatures and which have very low glass transition temperatures and a process for preparing them.

The foregoing objects and others which will become apparent from the following description are accomplished in accordance with this invention, generally speaking, by providing improved polyurethane elastomers and a method for preparing them by reacting as organic polyhydroxy compounds the condensation products of hexane-1,6-diol, adipic acid and diaryl carbonate which have a molecular weight of from about 800 to about 2500, organic diisocyanates and compounds containing at least two hydrogen atoms reactive with NCO groups and having a molecular weight of up to about 400 as chain lengthening agents.

The present invention is based on the finding that polyurethane elastomers which have a low freezing point and a high resistance to hydrolysis can also be obtained if the higher molecular weight hydroxy compounds which are reacted with diisocyanates and chain lengthening agents are of the type which are obtained by condensation of hexane-1,6-diol, adipic acid and diaryl carbonate, preferably diphenyl carbonate. Surprisingly, the elastomers produced from the higher molecular weight polyhydroxy compounds of this invention have both a very low freezing point and a very high resistance to hydrolysis as well as excellent mechanical properties.

The freezing point and the degree to which the elastomers of this invention are resistant to hydrolysis depend on the proportions of the three components used to prepare the higher molecular weight polyhydroxy compound of this invention. When only a small amount of diphenyl carbonate is used, the properties of the elastomers obtained from the polyol of this invention are similar to those obtained from polyesters of hexane-1,6-diol and adipic acid. Conversely, when only minor quantities of adipic acid are used, the elastomers obtained resemble the products described in French Pat. 1,540,799.

Although any suitable ratio of the reactants may be employed to obtain a molecular weight within the range of from about 800 to about 2500, it is preferred to employ a molar ratio of the reactants of from about 10:1 to about 3:2 of hexane-1,6-diol and adipic acid with the quantity of the diaryl carbonate so chosen that the molecular weight of the resulting higher molecular weight polyhydroxy compound is within the range of from about 800 to about 2500, and a preferably, about 2000. The preferred higher molecular weight polyhydroxy compounds generally have a pasty consistency and a softening point below about 30° C. although it is to be understood that any desired consistencey can be prepared and the softening point can also be above about 30° C. The polyhydroxy compounds thus prepared are particularly suitable for the production of elastomers which have a combined high resistance to hydrolysis and low freezing point.

Surprisingly, the hydrolysis resistance of the resulting elastomers is only insignificantly altered by the adipic acid which has been incorporated into the molecule.

The higher molecular weight polyhydroxy compounds of this invention may be prepared by any of the known methods. If desired, the three components may be condensed in the preferred proportions in one step with the evolution of phenol and water until the required hydroxyl number is reached. It is advisable, however, to condense the adipic acid with the hexane-1, 6-diol in a first step until an acid number of approximately 1 is reached, preferably at a molar ratio of hexane-1, 6-diol to adipic acid of 6:1 and, in a second step, to react the condensation product with the diaryl carbonate, preferably diphenyl carbonate.

Undesirable side reactions such as the premature saponification of the diaryl carbonate or esterification of adipic acid with the evolved phenol can thus be prevented.

The reaction of the higher molecular weight polyhydroxy compounds of this invention with organic diisocyanates and chain lengthening agents is carried out by methods which are known per se either in the melt or in in solvent solutions. Thus, for example, the higher molecular weight polyhydroxy compound may be reacted first with an excess of a diisocyanate to produce an NCO-terminated polymer which, after the addition of a low molecular weight chain lengthening agent containing at least two hydrogen atoms reactive with NCO groups, is shaped by casting or, if desired, converted after hardening into a granulate which can then be molded under pressure at elevated temperatures.

According to another procedure, the chain lengthening agent is added to the higher molecular weight anhydrous polyhydroxy compound of this invention, and the mixture of the two hydroxy compounds is then reacted with an excess, or an equivalent quantity, or less than an equivalent quantity of diisocyanate. If the diisocyanate is used in an equivalent or less than equivalent quantity, the products obtained are stable on storage and can be rolled. Further, after other diisocyanate, particularly dimeric tolylene diisocyanate, are rolled into such products, they can be cross-linked during molding at elevated temperatures.

If the chain lengthening agents are compounds which contain, in addition to the hydrogen atoms reactive with NCO groups, other reactive groups such as glycerol mono-allyl ether or di-b-hydroxymethyl-m-toluidine and the like, the cross-linking which takes place during molding may also be effected with sulphur, formaldehyde or peroxides.

Any suitable diisocyanates may be used in the practice of this invention including aliphatic, cycloaliphatic, araliphatic and aromatic diisocyanates such as, for example, 1,5-naphthylene diisocyanate, 4,4'-diphenylmethane diisocyanate, p-phenylene diisocyanate, tolylene diisocyanate, xylylene diisocyanate, hexamethylene diisocyanate, isophorone diisocyanate and any of those listed in U.S. Pat. Nos. 3,201,372 and 3,350,362 and the like and mixtures thereof.

Any suitable chain lengthening agents may be used including the conventional chain lengthening agents containing at least two hydrogen atoms reactive with NCO groups and having a molecular weight of up to about 400. Some such suitable chain lengthening compounds include, in particular, various types of glycols such as butane-1,4-diol, butane-2,3-diol, butene1-,4-diol, ethylene glycol neopentyl glycol, p-phenylene-di-b-hydroxyethyl ether, diamines such as 3,3'-dichloro-4,4'-diamino-diphenylmethane and the various diamines which contain ester groups, e.g. 3,5-diamino-4-chlorobenzoic acid esters and the like as described in U.S. patent application Ser. No. 866,373. Higher functional chain lengthening agents such as triols including for example, trimethylol propane, glycerol, diethanolamine and the like may be used in proportions of up to 50 percent based on the weight of the difunctional chain lengthening agents used. Any of the chain lengthening agents disclosed in U.S. Pat. No. 2,929,800 may also be used as well as mixtures thereof.

Any suitable diaryl carbonates may be employed including diphenyl carbonate, ditolyl carbonate, dinaphthyl carbonate, di-p-chlorophenyl carbonate and the like and mixtures thereof; diphenyl carbonate is preferred.

The products of the process of this invention have a variety of applications and are particularly suitable as sealing compounds and in the production of machine parts, plastic articles and shoe sole material. The products of this invention are generally useful in all areas in which polyurethane elastomers are used.

The invention is further illustrated but is not intended to be limited by the following examples in which all parts and percentages are by weight unless otherwise specified.

EXAMPLES

Starting materials $A_1$—About 3068 parts (26 mols) of hexane-1,6-diol are esterified with about 1898 parts (13 mol) of adipic acid in a melt in a 10-liter three-necked flask equipped with a stirrer, contact thermometer and a packed distillation column. The temperature is raised from about 130° C. to about 200° C. in the course of about 5 hours while the water of condensation is distilled off. A moderate stream of $CO_2$ is then passed through the melt at about 200° C. for about 8 hours to complete esterification. The last residues of water are removed at about 130° C. and 12 mm. Hg. A waxy mixture of diols having an OH number of 318 (calculated 324) and an acid number of 1.5 is obtained.

About 2354 parts (11 mols) of diphenyl carbonate are then introduced into the reaction vessel and the mixture is heated with stirring at about 12 mm. Hg. Phenol begins to distil off at between about 130° and about 145° C. The temperature is raised to about 200° C. in the course of about 12 hours according to the rate of distillation. At the end of that time. about 2020 parts (97.5 percent of theoretical) of phenol distil off. The pressure is then reduced to about 0.5 mm. Hg and stirring is continued for about 6 hours at about 200° C. A further about 40 parts of phenol are obtained. Total quantity: 2060 g. (99.75 percent of theoretical).

A yellow viscous oil having an OH number of 43.6 (calculated 46.1) is obtained.

$A_2$.—About 7080 parts (60 mols) of hexane-1,6-diol and 2190 parts (15 mols) of adipic are esterified to give a diol mixture having an OH number of 567 (calculated 577) as described in $A_1$. Ester interchange with about 8350 parts (39 mols of diphenyl carbonate yield a low melting wax having an OH number of 51.0.

$A_3$.—About 4248 parts (36 mols) of hexane-1,6-diol are esterified with about 875 parts (6 mols) of adipic acid to yield a diol mixture having an OH number of 680 (calculated 685).

The reaction of about 4610 parts (28 mols) of the diol mixture with about 5243 parts (24.5 mols) of diphenyl carbonate as described in $A_1$ yields a soft wax having an OH number of 72.8 (calculated 74.5).

EXAMPLE 1

About 2560 parts (1 mol) of the polyester polycarbonate $A_1$ and about 658 parts 3.14 mols) of 1,5-naphthylene diisocyanate are stirred together at about 126° C. After about 10 minutes under vacuum, about 180 parts (2 mols) of 1,4-butane diol are introduced into the melt. After thorough mixing, the mixture is poured into wax lined molds and heated for about 24 hous at about 100° C. The molded products have the properties given under 1 in the table.

EXAMPLE 2

As described in Example 1, about 2200 parts (1 mol) of polyester polycarbonate $A_2$ are reacted with about 552 parts (2.63 mols) of 1,5-naphthylene diisocyanate and about 110 parts (1.22 mols) of 1,4-butane diol. The properties of the molded product obtained are given under 2 in the table.

EXAMPLE 3

As described in Example 1, about 1540 parts (1 mol) of polyester polycarbonate $A_3$ are reacted with about 407 parts (1.94 mols) of 1,5-naphthylene diisocyanate and about 62 parts (0.685 mol) of 1,4-butane diol. The molded product obtained has the properties given under 3 in the table.

COMPARISON EXAMPLES

Example I

The reaction of about 2000 parts (1 mol) of a hexamethylene polycarbonate having an OH number of 56 with about 357 parts (1.7 mols) of 1,5-naphthylene diisocyanate and about 41 parts (0.45 mol) of 1,4-butane diol as described in Example 1 results in a molded product which has the properties given under I in the table.

Example II

An elastomer prepared as described in Example 1 from about 2000 parts (1 mol) of a polyester of adipic acid and hexanediol having an OH number of 56, about 357 parts (1.7 mols) of 1,5-naphthylene diisocyanate and about 41 parts (0.45 mol) of 1,4-butane diol has the properties given under II in the table.

TABLE

| | Examples and comparison examples— | | | | |
|---|---|---|---|---|---|
| | 1 | 2 | 3 | I | II |
| Shore hardness A | 95 | 94 | 95 | 90 | 89 |
| Shore hardness D | 45 | 45 | 45 | | |
| Tensile strength, kg./cm.² | 456 | 496 | 584 | 282 | 305 |
| Elongation at break, percent | 512 | 419 | 361 | 423 | 445 |
| Recoil elasticity, kg./cm | 54 | 50 | 43 | 48 | 49 |
| Dimensional stability | 60 | 66 | 45 | 40 | 43 |
| Aging by storage in water at 100° C.— Tensile strength after days in kg./cm.²: | | | | | |
| 2 | 369 | 398 | 430 | 252 | 235 |
| 4 | 281 | 306 | 385 | 248 | 155 |
| 7 | 189 | 223 | 263 | 230 | 118 |
| 14 | 64 | 110 | 131 | 170 | (¹) |
| 28 | (¹) | (¹) | 101 | 130 | (¹) |
| Glass transition temperature, ° C | −46 | −44 | −41 | −22 | −21 |

¹ Destroyed.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for preparing polymethane composition comprising reacting an organic diisocyanate with an organic compound containing at least two hydrogen atoms reactive with NCO groups and having a molecular weight of up to about 400 and a condensation product prepared by reacting in a first stage hexane diol with adipic acid such that the molar ratio is from about 10:1 to about 3:2 and until an acid number of approximately 1 is reached, and in a second stage reacting the reaction product of hexane diol and adipic acid with a sufficient quantity of diaryl carbonate to yield a molecular weight of from about 800 to about 2500.

2. The process of claim 1 wherein hexane-1,6-diol is esterified with adipic acid in a first stage of a molar ratio of about 6:1 and the first stage esterification product is then esterified in a second stage with a diaryl carbonate until a molecular weight of about 2000 is reached.

3. The process of claim 4 wherein the diaryl carbonate is diphenyl carbonate.

4. A composition of matter prepared by the process of claim 1.

5. The composition of matter of claim 4 wherein the condensation product is the condensation product of hexane-1,6-diol, adipic acid and diphenyl carbonate.

References Cited
UNITED STATES PATENTS

| 3,544,524 | 12/1970 | Müller et al. | 260—77.5 |
| 3,553,167 | 1/1971 | Schnell et al. | 260—47 |
| 3,640,967 | 2/1972 | König et al. | |

HOSEA E. TAYLOR, Primary Examiner

H. S. COCKERAM, Assistant Examiner

U.S. Cl. X.R.

260—77.5 AM, 77.5 AN, 77.5 D

UNITED STATES PATENT OFFICE
CERTIFICATE OF CORRECTION

Patent No. 3,758,443    Dated September 11, 1973

Inventor(s) Klaus Konig, Erwin Muller, Cornelius Muhlhausen, Uwe Jens Dobereiner It is certified that error appears in the above-identified patent and that said Letters Patent are hereby corrected as shown below:

Column 1, line 11, insert --Claims Priority, application Germany December 24, 1969 P 19 64 998.0--

Column 2, line 49, after "and" delete "a"

Column 3, line 8, before "solvent" delete "in", same column, line 31, "hydroxymethyl" should be --hydroxyethyl--

Column 4, line 53, "hous" should be --hours--

Column 6, line 2, "polymethane" should be --polyurethane--; same column line 19, after "Claim" delete "4" and insert --1--.

Signed and sealed this 1st day of October 1974.

(SEAL)
Attest:

McCOY M. GIBSON JR.
Attesting Officer

C. MARSHALL DANN
Commissioner of Patents